United States Patent
Nakao (10) Patent No.: US 9,692,925 B2
(45) Date of Patent: Jun. 27, 2017

(54) IMAGE PROCESSING APPARATUS THAT FACILITATES RESTORATION FROM PROTECTION MODE OF INCLUDED HARD DISK DRIVE, METHOD FOR CONTROLLING IMAGE PROCESSING APPARATUS, AND STORAGE MEDIUM

(71) Applicant: KYOCERA Document Solutions Inc., Osaka (JP)

(72) Inventor: Masahiro Nakao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/984,721

(22) Filed: Dec. 30, 2015

(65) Prior Publication Data

US 2016/0219176 A1 Jul. 28, 2016

(30) Foreign Application Priority Data

Jan. 28, 2015 (JP) .................................. 2015-014191

(51) Int. Cl.
*G06F 15/00* (2006.01)
*H04N 1/00* (2006.01)
*H04N 1/32* (2006.01)

(52) U.S. Cl.
CPC ..... *H04N 1/00899* (2013.01); *H04N 1/32625* (2013.01); *H04N 1/32657* (2013.01)

(58) Field of Classification Search
None
See application file for complete search history.

(56) References Cited

U.S. PATENT DOCUMENTS

| 5,832,331 | A | 11/1998 | Yoshida et al. ............ 399/43 |
| 2006/0050622 | A1 | 3/2006 | So et al. .................... 369/275.1 |
| 2009/0316554 | A1* | 12/2009 | Hinode .................. G11B 33/10 369/53.42 |
| 2014/0355023 | A1 | 12/2014 | Kojima ..................... 358/1.13 |

(Continued)

FOREIGN PATENT DOCUMENTS

| JP | 9-275461 A | 10/1997 |
| JP | 2003-335028 A | 11/2003 |

(Continued)

OTHER PUBLICATIONS

Japanese Office Action dated Jul. 13, 2016, issued by the Japanese Patent Office in corresponding application JP 2015-014191.

*Primary Examiner* — Helen Q Zong
(74) *Attorney, Agent, or Firm* — Stein IP, LLC (57) ABSTRACT

An image processing apparatus includes a mounting information holding circuit, an abnormality determination circuit, and a mounting execution circuit. The abnormality determination circuit determines whether or not a predetermined abnormality determination condition is met based on mounting information related to already-executed mounting held in the mounting information holding circuit when a hard disk drive is inaccessible. The mounting execution circuit sets a power supply of the hard disk drive in ON state after once setting in OFF state, and then executes mounting of the hard disk drive after the setting in ON state when the abnormality determination circuit determines that the abnormality determination condition is not met.

3 Claims, 4 Drawing Sheets

(56) References Cited

U.S. PATENT DOCUMENTS

2014/0380098 A1  12/2014  Matsusaka ...................... 714/23
2015/0052385 A1* 2/2015  Galbraith ............ G06F 12/0888
                                                        714/6.3
2015/0378858 A1* 12/2015  Ishizaka .............. G06F 11/1088
                                                        714/6.22

FOREIGN PATENT DOCUMENTS

| JP | 2005-353046 A | 12/2005 |
| JP | 2014-236417 A | 12/2014 |
| JP | 2015-5157 A   | 1/2015  |

* cited by examiner

IMAGE PROCESSING APPARATUS THAT FACILITATES RESTORATION FROM PROTECTION MODE OF INCLUDED HARD DISK DRIVE, METHOD FOR CONTROLLING IMAGE PROCESSING APPARATUS, AND STORAGE MEDIUM

INCORPORATION BY REFERENCE

This application is based upon, and claims the benefit of priority from, corresponding Japanese Patent Application No. 2015-014191 filed in the Japan Patent Office on Jan. 28, 2015, the entire contents of which are incorporated herein by reference.

BACKGROUND

Unless otherwise indicated herein, the description in this section is not prior art to the claims in this application and is not admitted to be prior art by inclusion in this section.

An image processing apparatus such as a scanner, a printer, a copier, or a multi-functional peripheral has been widely used in offices and similar place. The image processing apparatus is often connected to an information processing terminal such as a personal computer via a network such as a Local Area Network (LAN) in the offices and similar place, and shared among a plurality of users.

Such image processing apparatus includes a large-capacity hard disk drive (HDD). This ensures available for use by many users. This HDD additionally stores, for example, application software to achieve various functions included in the image processing apparatus. The image processing apparatus includes a CPU that reads this software, and executes the software to achieve various kinds of the functions.

For example, mounting of the HDD is executed in the image processing apparatus for activation to ensure access (data reading and data writing) to the HDD of the image processing apparatus. The image processing apparatus recognizes the HDD as hardware, and obtains file system management information stored in the HDD in this mounting. This ensures access to the HDD.

There has been a proposed technique that facilitates the confirmed consistency of file system management information when mounting as a technique related to such mounting. In this technique, a flag is set to "ON" indicating a possibility of non-consistency while executing a write request or a deletion request to a data storage unit of a storage medium. Then, the flag is set to an "OFF" after completing the process normally. Thus, referring to this flag ensures the confirmed consistency of the file system management information.

SUMMARY

An image processing apparatus including a hard disk drive according to one aspect of the disclosure includes a mounting information holding circuit, an abnormality determination circuit, and a mounting execution circuit. The mounting information holding circuit holds mounting information indicating whether or not mounting is normally completed when mounting the hard disk drive. The abnormality determination circuit determines whether or not a predetermined abnormality determination condition is met based on the mounting information related to already-executed mounting held in the mounting information holding circuit when the hard disk drive is inaccessible. The mounting execution circuit sets a power supply of the hard disk drive in ON state after once setting in OFF state, and then executes mounting of the hard disk drive after the setting in ON state when the abnormality determination circuit determines that the abnormality determination condition is not met.

A method for controlling an image processing apparatus including a hard disk drive according to another aspect of the disclosure includes holding mounting information, determining whether or not an abnormality determination condition is met, and executing mounting. Holding mounting information is holding mounting information indicating whether or not mounting is normally completed when mounting the hard disk drive. Determining whether or not an abnormality determination condition is met is determining whether or not a predetermined abnormality determination condition is met based on the mounting information related to already-executed mounting held when the hard disk drive is inaccessible. Executing mounting is setting a power supply of the hard disk drive in ON state after once setting in OFF state, and then executing mounting of the hard disk drive after the setting in ON state when determining that the abnormality determination condition is not met.

A non-transitory computer-readable recording medium according to yet another aspect of the disclosure stores a control program to control an image processing apparatus including a hard disk drive. The control program causes the image processing apparatus to function as a mounting information holding circuit, an abnormality determination circuit, and a mounting execution circuit. The mounting information holding circuit holds mounting information indicating whether or not mounting is normally completed when mounting the hard disk drive. The abnormality determination circuit determines whether or not a predetermined abnormality determination condition is met based on the mounting information related to already-executed mounting held in the mounting information holding circuit when the hard disk drive is inaccessible. The mounting execution circuit sets a power supply of the hard disk drive in ON state after once setting in OFF state, and then executes mounting of the hard disk drive after the setting in ON state when the abnormality determination circuit determines that the abnormality determination condition is not met.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure in more detail with reference to the drawings. The following embodies the disclosure as a digital multi-functional peripheral provided based on analysis analyzed by an inventor. Analysis analyzed by inventor An HDD moves its head with respect to a rotating platter to execute reading and writing data. There is a slight gap between the head and the rotating platter. However, the head physically contacts the platter if the platter stops rotation. This contact causes damage of the data or the HDD itself. Thus, the HDD includes a configuration where the head is evacuated when the platter is attempted to stop rotation. Consequently, first, the head is evacuated, and then the power supply is turned off in order to set a power supply of the HDD in OFF state.

When an instantaneous power failure or similar matter unintentionally decreases a power supply voltage supplied to the HDD, even such HDD cannot evacuate the head. At this time, this may cause damage of the data or the HDD itself. Thus, there has been an HDD with a protection mode. The protection mode is a mode ready for turning off a power supply. When the HDD transitions to the protection mode, the head is consequently evacuated, and then mount of the HDD is released. The HDD having the protection mode transitions to the protection mode when an instruction to turn off the power supply is input, or the power supply voltage supplied to the HDD decreases to less than a predetermined threshold voltage.

In an image processing apparatus including the HDD having the protection mode, the HDD automatically transitions to the protection mode even when an instantaneous power failure, for example, unintentionally decreases the power supply voltage supplied to the HDD. This can avoid, for example, damage of the HDD. However, in the case of the instantaneous power failure, the power supply voltage instantaneously decreases and then returns to a normal voltage. In this case, when a power supply of the image processing apparatus itself is even in ON state, and the power supply voltage supplied to the HDD decreases to equal to or less than the predetermined threshold voltage in association with a decrease of the power supply voltage due to the instantaneous power failure, the HDD consequently transitions to the protection mode. In this time, since the mount of the HDD is released, the image processing apparatus cannot access the HDD. Consequently, the image processing apparatus cannot normally operate. Then, a user cannot use the image processing apparatus.

As described above, the protection mode is a mode ready for turning off a power supply. Thus, the user needs to set the power supply of the HDD that has transitioned to the protection mode in OFF state. Accordingly, the power supply of the image processing apparatus is once turned off in the case of inaccessibility of the HDD due to the transition of the HDD to the protection mode. Then, the user needs to turn on the power supply of the image processing apparatus again after a lapse of around a few seconds to surely set the power supply voltage of the HDD in OFF state. This releases the protection mode of the HDD, and then the HDD is normally mounted.

Figure 1:
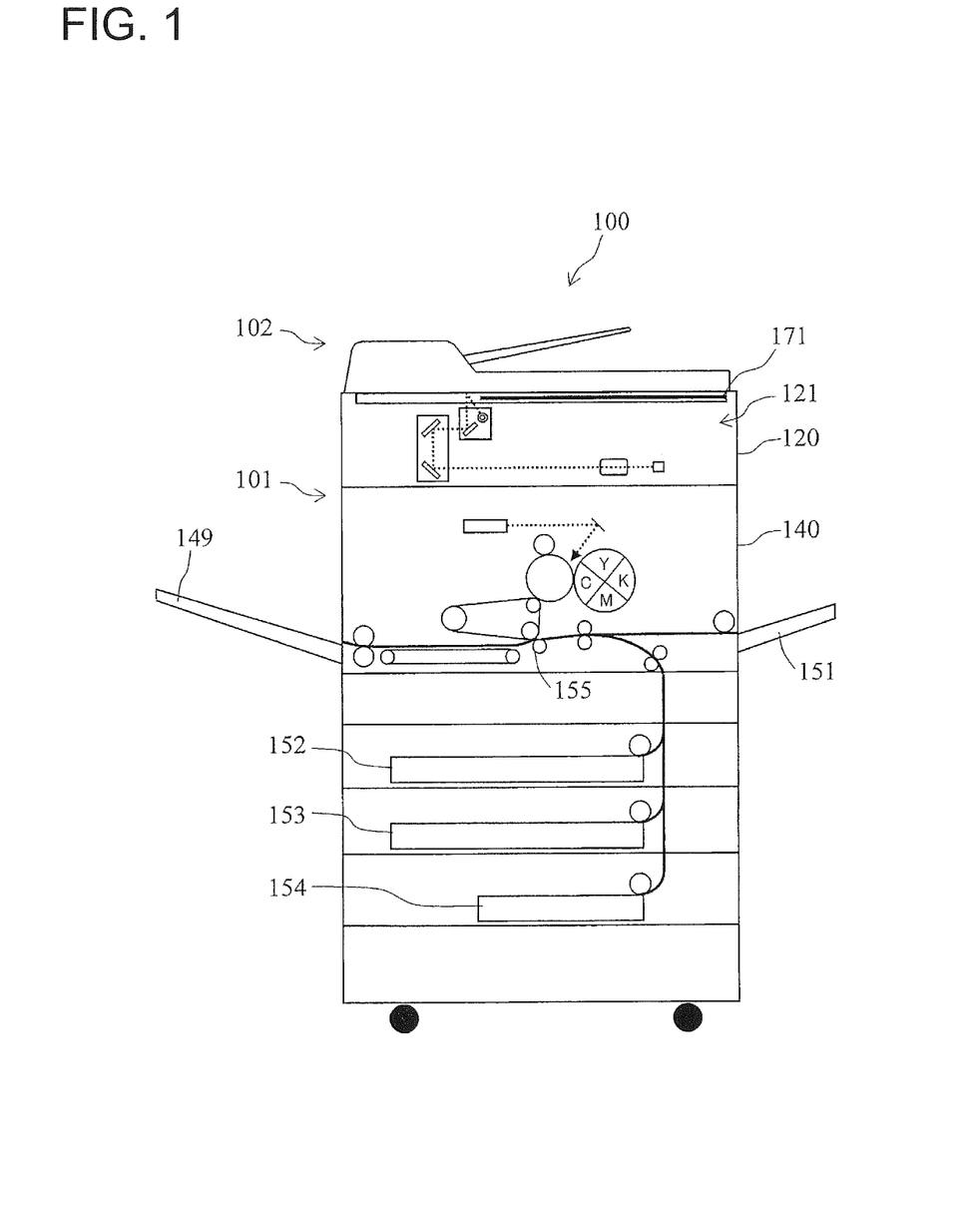
FIG. 1 schematically illustrates an overall configuration of a multi-functional peripheral according to one embodiment of the disclosure.

As described above, if the instantaneous power failure occurs, the user may need to reboot the image processing apparatus for use. Embodiment FIG. 1 schematically illustrates one example of overall configuration of the digital multi-functional peripheral according to the embodiment. As illustrated in FIG. 1, a multi-functional peripheral 100 includes a main body 101, which includes an image reading unit 120 and an image forming unit 140, and a platen cover 102 installed above the main body 101. The multi-functional peripheral 100 has an operational panel 171 located on a front surface. Using the operation panel 171, a user can give an instruction of a start of copying or other instructions to the multi-functional peripheral 100, and see a state or a setting of the multi-functional peripheral 100.

The image reading unit 120 is located upper the main body 101. The image reading unit 120 reads an image of an original document using a scanning optical system 121 to generate digital data of its image (image data).

The multi-functional peripheral 100 can print the generated image data on a paper sheet at the image forming unit 140. Additionally, the multi-functional peripheral 100 can transmit the generated image data to another apparatus via a network (not illustrated).

The image forming unit 140 prints image data generated by the image reading unit 120 or image data received from another apparatus (not illustrated) via the network on a paper sheet. The image forming unit 140 feeds a paper sheet from, for example, a bypass tray 151 and sheet feed cassettes 152, 153, and 154 to a transfer unit 155, which transfers a toner image. A paper sheet on which a toner image is transferred by the transfer unit 155 is discharged to a sheet discharge tray 149.

Figure 2:
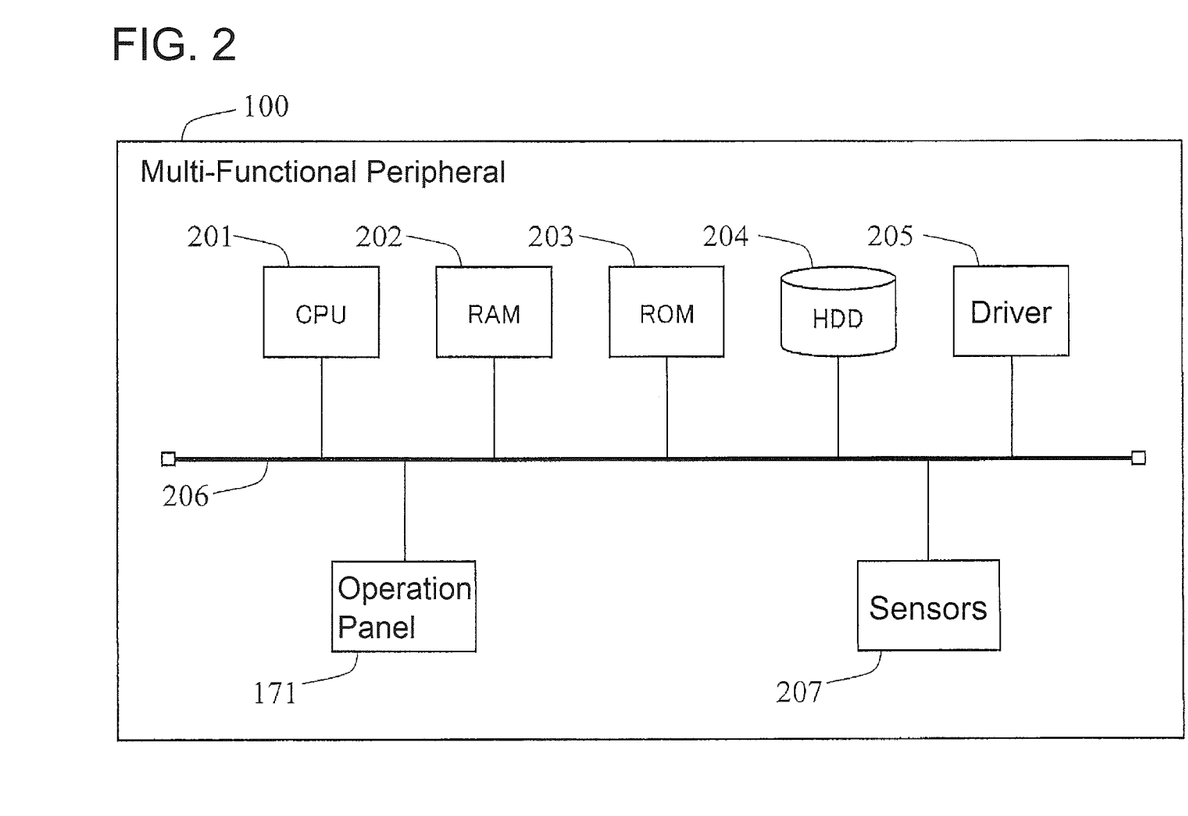
FIG. 2 illustrates a hardware configuration of the multi-functional peripheral according to the one embodiment.

FIG. 2 illustrates a hardware configuration of a control system in the digital multi-functional peripheral. In the multi-functional peripheral 100 of the embodiment, a Central Processing Unit (CPU) 201, a Random Access Memory (RAM) 202, a Read Only Memory (ROM) 203, a Hard Disk Drive (HDD) 204, and a driver 205 are connected via an internal bus 206. The driver 205 corresponds to respective driving units of the image reading unit 120 and the image forming unit 140. The ROM 203, the HDD 204, and similar storage store programs, and the CPU 201 controls the multi-functional peripheral 100 in accordance with a command of a control program among the programs. For example, the CPU 201 uses the RAM 202 as a work area, and transmits and receives data and an instruction from/to the driver 205. This controls operations of the respective driving units described above. The HDD 204 is additionally used for the case where image data obtained from the image reading unit 120 and image data received from another apparatus via the network are accumulated.

The internal bus 206 additionally connects to the operation panel 171 and various kinds of sensors 207. The operation panel 171 accepts a user operation, and then supplies a signal based on the user operation to the CPU 201. The operation panel 171 displays an operation screen on a touch panel display included in the operation panel 171 in accordance with a control signal from the CPU 201. These sensors 207 include various kinds of sensors such as an open/close detection sensor for the platen cover 102, a detection sensor for an original document on a platen, a temperature sensor for a fixing unit, and a detection sensor for a paper sheet to be fed or an original document.

For example, execution of the program stored in the ROM 203 causes the CPU 201 to achieve the following respective units and, control operations of the respective units in response to signals from these sensors 207.

Figure 3:
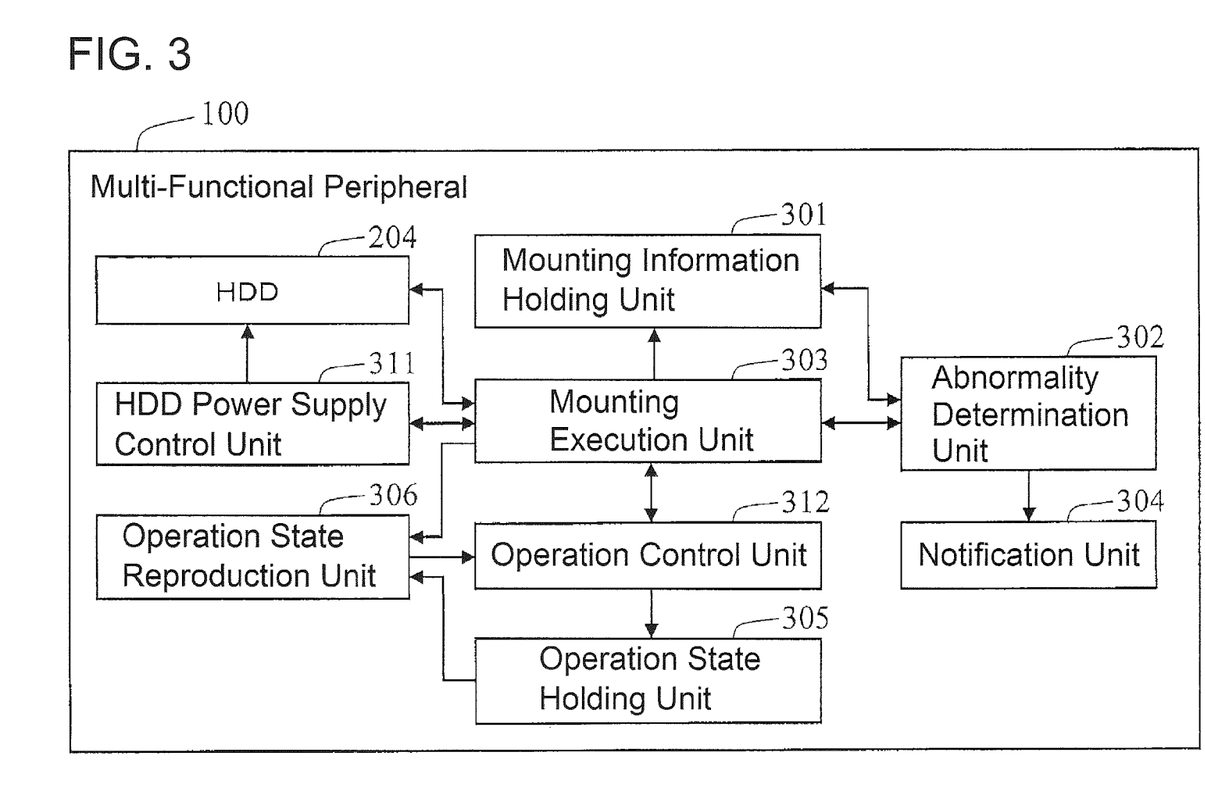
FIG. 3 illustrates the multi-functional peripheral according to the one embodiment.

FIG. 3 illustrates the multi-functional peripheral according to the embodiment. As illustrated in FIG. 3, the multi-functional peripheral 100 includes a mounting information holding unit 301, an abnormality determination unit 302, and a mounting execution unit 303. The mounting information holding unit 301 is also referred to as a mounting information holding circuit. The abnormality determination unit 302 is also referred to as an abnormality determination circuit. The mounting execution unit 303 is also referred to as a mounting execution circuit.

The mounting information holding unit 301 holds mounting information indicating whether or not mounting is normally completed when mounting the HDD 204. The mounting is a process for configuring the HDD 204 detected as hardware and thus ensuring access (data reading and data writing) to the HDD 204. Completing the mounting normally ensures access to the HDD 204 by, for example, the CPU 201. Mounting information held in the mounting information holding unit 301 includes at least mounting information of the HDD 204 related to most recently executed mounting. Not specifically limited, the mounting information holding unit 301 of the embodiment holds mounting information of the HDD 204 related to several times of the recently executed mountings in the past. Here, each piece of mounting information is constituted by one bit data. For example, when the HDD 204 is normally mounted, "1" is recorded as the mounting information. Then, when the HDD 204 is not normally mounted, "0" is recorded as the mounting information. A non-volatile storage medium such as a non-volatile memory can constitute a data holding region of the mounting information holding unit 301. In the embodiment, a flash memory (the ROM 203), which is a storage medium separated from the HDD 204, is used as the data holding region of the mounting information holding unit 301.

When the HDD 204 is not accessible, the abnormality determination unit 302 determines whether or not a predetermined abnormality determination condition is met based on the mounting information related to already-executed mounting held in the mounting information holding unit 301. Not specifically limited, "the most recently executed mounting is not normally completed" is specified as an abnormality determination condition of the embodiment.

When the abnormality determination unit 302 determines that the abnormality determination condition is not met, the mounting execution unit 303 sets a power supply of the HDD 204 in OFF state once and then sets in ON state, and then mounts the HDD 204. In the embodiment, an HDD power supply control unit 311 controls a power delivery to the HDD 204. Thus, inputting an instruction to the HDD power supply control unit 311 causes the mounting execution unit 303 to turn off the power and turn on the power of the HDD 204. The embodiment employs a configuration where the mounting execution unit 303 inputs an instruction of turning on the power to the HDD power supply control unit 311 after a lapse of around a few seconds after outputting an instruction of turning off the power so as to surely set the power supply of the HDD 204 in OFF state.

As illustrated in FIG. 3, the multi-functional peripheral 100 further includes a notification unit 304, an operation state holding unit 305, and an operation state reproduction unit 306. The notification unit 304 is also referred to as a notification circuit. The operation state holding unit 305 is also referred to as an operation state holding circuit. The operation state reproduction unit 306 is also referred to as an operation state reproduction circuit.

When the abnormality determination unit 302 determines that the abnormality determination condition is met, the notification unit 304 notifies a user of a fact that there is an abnormality in the HDD 204. A notification method is not specifically limited. Any method, recognizable by a user, such as a display, a sound, a printed matter, and an e-mail may be employed. Here, the notification unit 304 displays an alert message on the touch panel display included in the operation panel 171 to notify the user of the abnormality of the HDD 204.

When a specified event, which is predetermined, occurs, the operation state holding unit 305 holds an operation state of the multi-functional peripheral 100 at the time point. The specified event means an instruction of the user that involves a state change of the multi-functional peripheral 100. This state change includes a change of various kinds of set values set in the multi-functional peripheral 100 and similar change, and additionally includes, for example, a display screen change on the touch panel display included in the operation panel 171 such as a display of a pop-up screen for inputting numerical values. For example, the specified event can be an instruction to select one function among various kinds of functions, which is executable by the multi-functional peripheral 100, such as a facsimile transmission function, an image reading function, and a copy function, a change instruction of a set value, and similar instruction. An operation state includes a value of various kinds of the set values and a display of a display screen on the touch panel display included in the operation panel 171. Here, a change of the set value or an instruction involving a display screen change of the touch panel display are registered as the specified event. Every time an instruction corresponding to the specified event is input, the operation state holding unit 305 stores the operation state of the multi-functional peripheral 100.

Not specifically limited, the embodiment includes a configuration where an operation control unit 312 controls execution of various kinds of processes (for example, an image reading process, a facsimile transmitting/receiving process, and an image formation process) in the multi-functional peripheral 100. Namely, various kinds of instructions by the user are input to the operation control unit 312, and then the operation control unit 312 executes image processing corresponding to these various kinds of instructions. Thus, the embodiment includes a configuration where the operation state holding unit 305 obtains the operation state of the multi-functional peripheral 100 from the operation control unit 312. A non-volatile storage medium, such as a non-volatile memory, can constitute a data holding region of the operation state holding unit 305. In the embodiment, a flash memory (the ROM 203), which is a storage medium separated from the HDD 204, is used as the data holding region of the operation state holding unit 305.

When the mounting execution unit 303 executes the mounting of the HDD 204 in response to a decrease of a power supply voltage supplied to the HDD 204, the operation state reproduction unit 306 reproduces an operation state held in the operation state holding unit 305, as the operation state of the multi-functional peripheral 100, after execution of this mounting. The embodiment includes a configuration where inputting the operation state held in the operation state holding unit 305 to the operation control unit 312 causes the operation state reproduction unit 306 to reproduce the operation state of the multi-functional peripheral 100.

Figure 4:
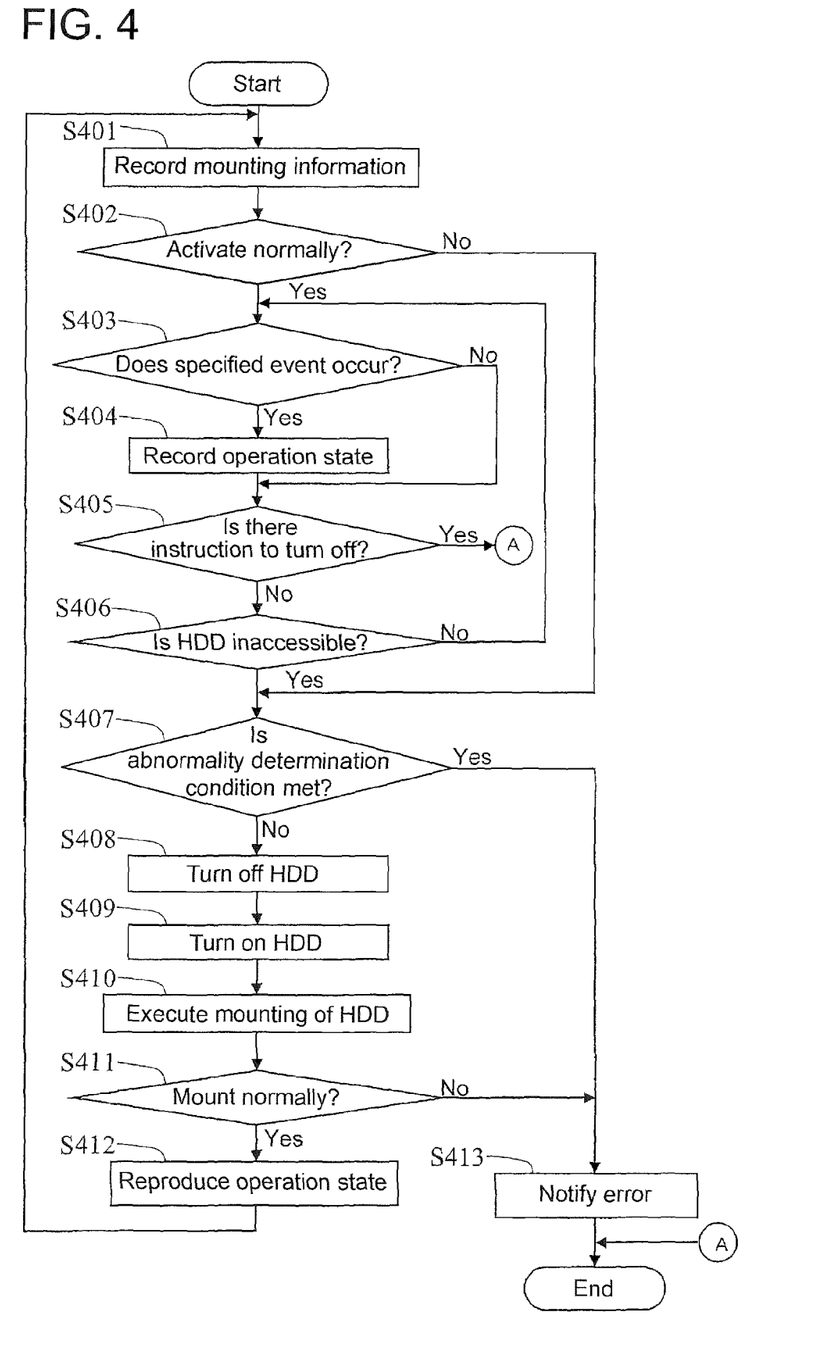
FIG. 4 illustrates one example of an HDD remounting procedure executed by the multi-functional peripheral according to the one embodiment.

FIG. 4 illustrates one example of an HDD remounting procedure executed by the multi-functional peripheral 100. This procedure starts with, for example, setting a power supply of the multi-functional peripheral 100 in ON state as a trigger.

When this procedure starts, the CPU 201 reads an activation program (firmware) stored in the ROM 203 to execute the program in the multi-functional peripheral 100. The mounting execution unit 303 executes the mounting of the HDD 204 in an execution process of this activation program. Then, the mounting information, which is a result of the mounting of the HDD 204, is stored in the mounting information holding unit 301 (Step S401).

When the mounting of the HDD 204 is normally completed, the CPU 201 reads various kinds of application software from the HDD 204 to execute the software. This configures the multi-functional peripheral 100 to execute various kinds of functions (Yes at Step S402).

In this state, the multi-functional peripheral 100 waits until the specified event described above occurs (No at Step S403, No at S405, and No at S406). When the specified event described above occurs, the operation state holding unit 305 obtains the operation state of the multi-functional peripheral 100 at the time point, from the operation control unit 312 to hold the obtained operation state (Yes at Step S403, S404, No at S405, and No at S406).

Assume that an instantaneous power failure or similar matter instantaneously decreases a voltage of a commercial power supply supplied to the multi-functional peripheral 100 under the condition described above. When the HDD 204 transitions to the protection mode in association with this voltage decrease, the mount of the HDD 204 is released. This causes the HDD 204 to be inaccessible by the multi-functional peripheral 100 (Yes at Step S406). At this time, the mounting execution unit 303 instructs the abnormality determination unit 302 to determine whether or not there is the abnormality in the HDD 204.

The abnormality determination unit 302 obtains the mounting information related to the most recently executed mounting from the mounting information holding unit 301 in response to this instruction. Then, the abnormality determination unit 302 determines whether or not a predetermined abnormality determination condition (here, "the most recently executed mounting is not normally completed) is met. At this time, the abnormality determination unit 302 notifies the mounting execution unit 303 of a determination result. In this example, the most recently executed mounting is normally completed. Thus, the abnormality determination unit 302 notifies the mounting execution unit 303 of a fact that the abnormality determination condition is not met (No at Step S407).

First, the mounting execution unit 303 that has received this notification sets the power supply of the HDD 204 in OFF state via the HDD power supply control unit 311 (Step S408). Next, the mounting execution unit 303 sets the power supply of the HDD 204 in ON state via the HDD power supply control unit 311 (Step S409). Then, the mounting execution unit 303 executes the mounting of the HDD 204 (Step S410).

After the mounting of the HDD 204 is normally completed, the mounting execution unit 303 notifies the operation state reproduction unit 306 of that the mounting is normally completed (Yes at Step S411). The operation state reproduction unit 306 inputs the operation state held in the operation state holding unit 305 to the operation control unit 312 in response to this notification (Step S412). This causes the operation state of the multi-functional peripheral 100 to be set to an operation state of a time point at which the HDD 204 becomes inaccessible. The mounting information, which is a result of the mounting of the HDD 204, in this case is stored in the mounting information holding unit 301 (Step S401).

On the other hand, when the mounting of the HDD 204 after the power supply of the HDD 204 is switched from OFF state to ON state is not normally completed, it is consequently determined that the transition of the HDD 204 to the protection mode does not cause the HDD 204 to become inaccessible. In this case, the mounting execution unit 303 notifies the notification unit 304 of the result of the determination (No at Step S411). The notification unit 304 displays an alert message indicating that the HDD 204 is possibly damaged on the touch panel display included in the operation panel 171 in response to this notification (Step S413).

When the mounting of the HDD 204 is not normally completed in execution steps of the activation program described above and an abnormality of the mounting continuously occurs, a result of determination whether or not the abnormality determination condition is met determined by the abnormality determination unit 302 is "the abnormality determination condition is met" (No at Step S402 and Yes at S407). In this time, the abnormality determination unit 302 notifies the mounting execution unit 303 of a fact that the abnormality determination condition is met. At this time, the mounting execution unit 303 notifies the notification unit 304 of the fact (No at Step S411). The notification unit 304 displays an alert message indicating that the HDD 204 is possibly damaged, or there may be a problem, for example, a connection problem of the HDD 204 on the touch panel included in the operation panel 171 in response to this notification (Step S413).

When the user inputs an instruction to set the power supply of the multi-functional peripheral 100 in OFF state under a condition where the multi-functional peripheral 100 waits an occurrence of the specified event, the procedure directly terminates (Yes at Step S405).

The above has described a case where the CPU 201 keeps operating normally while the HDD 204 transitions to the protection mode due to, for example, an instantaneous power failure. However, a decrease of a power supply voltage supplied to the CPU 201 due to, for example, an instantaneous power failure may cause an inoperable CPU 201.

In the embodiment, when the power supply voltage supplied to the CPU 201 decreases to equal to or less than a predetermined voltage, the CPU 201 executes a rebooting of the multi-functional peripheral 100. The rebooting of this case is consequently executed while the HDD 204 remains in the transitioned protection mode. Thus, the mounting of the HDD 204 is not normally completed in the execution steps of the activation program described above (No at Step S402).

However, the HDD 204 is normally mounted before the rebooting caused by the instantaneous power failure. Consequently, the last mounting information (mounting information on the mounting executed immediately before this rebooting) stored in the mounting information holding unit 301 indicates "normal completion." Thus, a determination result determined by the abnormality determination unit 302 whether or not the abnormality determination condition is met is "the abnormality determination condition is not met"

(No at Step S407). In this case, the mounting execution unit 303 executes, in the following order, turning off the HDD 204 (Step S408), turning on the HDD 204 (Step S409), and the mounting of the HDD 204 (Step S410). As a result, the HDD 204 is normally mounted (Yes at Step S411).

As described above, the multi-functional peripheral 100 can be automatically restored even when the HDD 204 is not inaccessible caused by the protection mode transitioned by the HDD 204 due to, for example, an instantaneous power failure. This eliminates the need for a restoration operation by the user. If the HDD 204 is out of order, the user is notified it. An operation state at a time point at which the multi-functional peripheral 100 becomes unusable due to an inaccessible HDD 204 is reproduced in the multi-functional peripheral 100 after this automatic restoration. This allows the user to resume a previous work immediately, and consequently ensures the improved convenience for the user.

The embodiment as described above does not limit the technical scope of the disclosure. Various modifications and applications are possible within the scope of the disclosure in addition to the embodiment described already. While, for example, the embodiment described above has described a configuration where the embodiment includes the notification unit 304, the operation state holding unit 305, and the operation state reproduction unit 306 as an especially preferable configuration, these are not essential components for the disclosure. The HDD 204 transitioned to the protection mode can be automatically remounted without a configuration including these components.

Additionally, while the embodiment described above includes a configuration where an abnormality determination is executed based on a result of the most recently executed mounting, the embodiment can employ other abnormality determination conditions such as an abnormality determination based on a result of several times of the recently executed mounting in the past.

Additionally, the flowchart illustrated in FIG. 4 can be appropriately changed within the scope achieving the equivalent effect.

Furthermore, while the embodiment described above has embodied the disclosure as a digital multi-functional peripheral, not limited to the digital multi-functional peripheral, the disclosure can also be applied to any image processing apparatus with an HDD, such as a scanner and a copier.

With the disclosure, the HDD of the disclosure can be restored without troubling a user even when an image processing apparatus is unusable due to an inaccessible HDD caused by the protection mode transitioned by the HDD due to, for example, an instantaneous power failure. Thus, the disclosure is effective.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image processing apparatus including a hard disk drive, comprising:
    a mounting information holding circuit that holds mounting information indicating whether or not mounting is normally completed when mounting the hard disk drive;
    an abnormality determination circuit that determines whether or not a predetermined abnormality determination condition is met based on the mounting information related to already-executed mounting held in the mounting information holding circuit when the hard disk drive is inaccessible;
    a mounting execution circuit that sets a power supply of the hard disk drive to ON state after once setting to OFF state, and then executes mounting of the hard disk drive after the setting to ON state when the abnormality determination circuit determines that the abnormality determination condition is not met;
    an operation state holding circuit that holds an operation state of the image processing apparatus at a time point at which a predetermined specified event occurs; and
    an operation state reproduction circuit that reproduces the operation state held in the operation state holding circuit as an operation state of the image processing apparatus after executing mounting when the mounting execution circuit executes the mounting of the hard disk drive in response to a decrease of a power supply voltage supplied to the hard disk drive.

2. The image processing apparatus according to claim 1, further comprising
    a notification circuit that notifies an abnormality of the hard disk drive when the abnormality determination circuit determines that the abnormality determination condition is met.

3. The image processing apparatus according to claim 1, wherein the abnormality determination condition is that most recently executed mounting is not normally completed.

* * * * *